US007299286B2

(12) United States Patent
Ramsayer et al.

(10) Patent No.: US 7,299,286 B2
(45) Date of Patent: *Nov. 20, 2007

(54) PERSONAL USER AGENT

(75) Inventors: Christopher G. Ramsayer, Apex, NC (US); Jeong Min Kim, Allen, TX (US); PhilipJohn Campion, Apex, NC (US); William Clyde Prentice Dalrymple, Cary, NC (US); Steve J. McKinnon, Cary, NC (US); Ta-Ming Chen, Cary, NC (US)

(73) Assignee: Nortel Networks Limited, St. Laurent (CA)

( * ) Notice: Subject to any disclaimer, the term of this patent is extended or adjusted under 35 U.S.C. 154(b) by 913 days.

This patent is subject to a terminal disclaimer.

(21) Appl. No.: 10/036,247

(22) Filed: Dec. 27, 2001

(65) Prior Publication Data
US 2005/0223097 A1 Oct. 6, 2005

(51) Int. Cl.
*G06F 15/16* (2006.01)

(52) U.S. Cl. .................. 709/228; 709/204; 709/227; 709/229; 709/238

(58) Field of Classification Search .............. 709/228
See application file for complete search history.

(56) References Cited

U.S. PATENT DOCUMENTS

| | | |
|---|---|---|
| 4,932,050 A | 6/1990 | Davidson et al. ............ 379/211 |
| 5,185,782 A | 2/1993 | Srinivasan .................... 379/67 |
| 5,243,645 A | 9/1993 | Bissell et al. ................ 379/211 |
| 5,315,636 A | 5/1994 | Patel ............................ 379/58 |
| 5,414,759 A | 5/1995 | Ishikuri et al. ................ 379/88 |
| 5,450,613 A | 9/1995 | Takahara et al. ........... 455/54.1 |
| 5,550,907 A | 8/1996 | Carlsen ....................... 379/207 |
| 5,555,376 A | 9/1996 | Theimer et al. ........ 395/200.09 |
| 5,596,633 A | 1/1997 | Meier et al. ................. 379/201 |
| 5,633,921 A | 5/1997 | Soderberg .................... 379/207 |
| 5,633,924 A | 5/1997 | Kaish et al. ................. 379/266 |
| 5,742,905 A | 4/1998 | Pepe et al. ................... 455/461 |
| 5,757,901 A | 5/1998 | Hiroshige .................... 379/212 |
| 5,771,280 A | 6/1998 | Johnson .................... 379/93.23 |

(Continued)

FOREIGN PATENT DOCUMENTS

EP 1071295 A2 1/2001

(Continued)

OTHER PUBLICATIONS

International Search Report for related application PCT/US02/40882, mailed Oct. 8, 2003.

(Continued)

*Primary Examiner*—Yves Dalencourt
(74) *Attorney, Agent, or Firm*—Withrow & Terranova, PLLC

(57) ABSTRACT

The present invention relates to a personal user agent acting on behalf of a group of member device agents in a communication network. The personal user agent provides its group of member device agents with a specialized proxy function, while representing the group to the network as a single user agent. To devices on the communication network, the personal user agent behaves and is viewed as a user agent. To the group of member device agents, the personal user agent behaves and is viewed as both a registrar and a proxy server.

36 Claims, 5 Drawing Sheets

U.S. PATENT DOCUMENTS

| | | | |
|---|---|---|---|
| 5,790,649 A | 8/1998 | Hiroshige | 379/201 |
| 5,812,865 A | 9/1998 | Theimer et al. | 395/800 |
| 5,815,554 A | 9/1998 | Burgess et al. | 379/90.01 |
| 5,825,864 A | 10/1998 | McGraw et al. | 379/210 |
| 5,930,702 A | 7/1999 | Goldman et al. | 455/417 |
| 5,960,173 A | 9/1999 | Tang et al. | |
| 6,058,415 A | 5/2000 | Polcyn | 709/200 |
| 6,067,357 A | 5/2000 | Kishinsky et al. | 379/265 |
| 6,104,913 A | 8/2000 | McAllister | 455/41 |
| 6,125,176 A | 9/2000 | Foladare et al. | 379/211 |
| 6,134,314 A | 10/2000 | Dougherty et al. | 379/207 |
| 6,141,356 A | 10/2000 | Gorman | 370/493 |
| 6,144,644 A | 11/2000 | Bajzath et al. | 370/259 |
| 6,148,328 A | 11/2000 | Cuomo et al. | 709/204 |
| 6,175,616 B1 | 1/2001 | Light et al. | 379/88.14 |
| 6,185,292 B1 | 2/2001 | Miloslavsky | 379/265 |
| 6,223,165 B1 | 4/2001 | Lauffer | 705/8 |
| 6,243,398 B1 | 6/2001 | Kahane et al. | 370/522 |
| 6,253,230 B1 | 6/2001 | Couland et al. | |
| 6,260,148 B1 | 7/2001 | Aggarwal et al. | 713/201 |
| 6,295,348 B1 | 9/2001 | Bleile et al. | 379/199 |
| 6,301,609 B1 | 10/2001 | Aravamudan et al. | 709/207 |
| 6,330,322 B1 | 12/2001 | Foladare et al. | |
| 6,377,944 B1 | 4/2002 | Busey et al. | 707/3 |
| 6,389,127 B1 | 5/2002 | Vardi et al. | 379/209.01 |
| 6,418,198 B2 | 7/2002 | Brablec et al. | 379/79 |
| 6,430,289 B1 | 8/2002 | Liffick | 379/900 |
| 6,445,912 B1 | 9/2002 | Cole et al. | 455/406 |
| 6,449,344 B1 | 9/2002 | Goldfinger et al. | 379/88.17 |
| 6,463,142 B1 | 10/2002 | Kilp | 379/201.06 |
| 6,463,471 B1 | 10/2002 | Dreke et al. | 709/224 |
| 6,480,593 B1 | 11/2002 | Munday et al. | 379/211.02 |
| 6,483,900 B1 | 11/2002 | Light et al. | 379/88.17 |
| 6,519,639 B1 | 2/2003 | Glasser et al. | |
| 6,546,096 B1 | 4/2003 | Meiden et al. | 379/209.01 |
| 6,560,648 B1 | 5/2003 | Dunn et al. | |
| 6,564,261 B1* | 5/2003 | Gudjonsson et al. | 709/227 |
| 6,584,494 B1 | 6/2003 | Mannabe et al. | 709/204 |
| 6,617,969 B2 | 9/2003 | Tu et al. | |
| 6,618,710 B1 | 9/2003 | Zondervan et al. | |
| 6,640,241 B1 | 10/2003 | Ozzie et al. | |
| 6,658,095 B1 | 12/2003 | Yoakum et al. | 379/93.01 |
| 6,665,395 B1 | 12/2003 | Busey et al. | 379/265.09 |
| 6,678,719 B1 | 1/2004 | Stimmel | |
| 6,697,840 B1 | 2/2004 | Godefroid et al. | 709/205 |
| 6,700,966 B2 | 3/2004 | Takagi et al. | 379/201.06 |
| 6,728,754 B1 | 4/2004 | Lipton | |
| 6,735,701 B1 | 5/2004 | Jacobson | 713/201 |
| 6,738,461 B2 | 5/2004 | Trandal et al. | 379/142.02 |
| 6,799,209 B1 | 9/2004 | Hayton | |
| 6,807,423 B1 | 10/2004 | Armstrong et al. | 455/440 |
| 6,810,411 B1 | 10/2004 | Coughlin et al. | |
| 6,920,498 B1 | 7/2005 | Gourlay et al. | |
| 6,985,961 B1* | 1/2006 | Ramsayer et al. | 709/238 |
| 7,103,651 B2 | 9/2006 | Bohannon et al. | |
| 2001/0005412 A1 | 6/2001 | Light et al. | 379/88.13 |
| 2001/0039585 A1 | 11/2001 | Primak et al. | |
| 2001/0044299 A1 | 11/2001 | Sandegren | 455/422 |
| 2001/0053213 A1 | 12/2001 | Truong et al. | 379/202.01 |
| 2001/0053214 A1 | 12/2001 | Kleinoder et al. | 379/207.04 |
| 2002/0006803 A1 | 1/2002 | Mendiola et al. | |
| 2002/0024947 A1 | 2/2002 | Luzzatti et al. | 370/352 |
| 2002/0035605 A1 | 3/2002 | McDowell et al. | 709/206 |
| 2002/0038360 A1 | 3/2002 | Andrews et al. | 709/223 |
| 2002/0049842 A1 | 4/2002 | Huetsch et al. | |
| 2002/0055975 A1 | 5/2002 | Petrovykh | 709/205 |
| 2002/0059622 A1 | 5/2002 | Grove et al. | 725/91 |
| 2002/0060988 A1 | 5/2002 | Shtivelman | 370/259 |
| 2002/0065894 A1 | 5/2002 | Dalal et al. | 709/206 |
| 2002/0076010 A1 | 6/2002 | Sahai | 379/88.19 |
| 2002/0078188 A1 | 6/2002 | Anand et al. | |
| 2002/0101993 A1 | 8/2002 | Eskin | 380/270 |
| 2002/0114432 A1 | 8/2002 | Shaffer et al. | 379/90.01 |
| 2002/0116336 A1 | 8/2002 | Diacakis et al. | 705/51 |
| 2002/0116461 A1 | 8/2002 | Diacakis et al. | 709/204 |
| 2002/0120687 A1 | 8/2002 | Diacakis et al. | 709/204 |
| 2002/0126701 A1 | 9/2002 | Requena | 370/469 |
| 2002/0131395 A1 | 9/2002 | Wang | |
| 2002/0143876 A1 | 10/2002 | Boyer et al. | 709/205 |
| 2002/0143877 A1 | 10/2002 | Hackbarth et al. | 709/205 |
| 2002/0147008 A1 | 10/2002 | Kallio | |
| 2002/0147777 A1 | 10/2002 | Hackbarth et al. | 709/205 |
| 2002/0147814 A1* | 10/2002 | Kimchi et al. | 709/226 |
| 2002/0163572 A1 | 11/2002 | Center, Jr. et al. | 348/14.08 |
| 2002/0165000 A1 | 11/2002 | Fok | |
| 2002/0181693 A1 | 12/2002 | Ribera | 379/265.09 |
| 2002/0194335 A1 | 12/2002 | Maynard | |
| 2002/0196770 A1 | 12/2002 | Lin | |
| 2003/0004762 A1 | 1/2003 | Banerjee et al. | 705/5 |
| 2003/0018704 A1 | 1/2003 | Polychronidis et al. | 709/202 |
| 2003/0023623 A1 | 1/2003 | Horvitz et al. | |
| 2003/0023681 A1 | 1/2003 | Brown et al. | 709/204 |
| 2003/0026289 A1 | 2/2003 | Mukherjee et al. | |
| 2003/0028621 A1 | 2/2003 | Furlong et al. | |
| 2003/0035529 A1 | 2/2003 | Baker | 379/211.02 |
| 2003/0037103 A1 | 2/2003 | Salmi | 709/203 |
| 2003/0037113 A1 | 2/2003 | Petrovykh | 709/205 |
| 2003/0041101 A1 | 2/2003 | Hansche et al. | 709/203 |
| 2003/0048195 A1 | 3/2003 | Trossen | |
| 2003/0052915 A1 | 3/2003 | Brown et al. | 345/752 |
| 2003/0055897 A1 | 3/2003 | Brown et al. | 709/205 |
| 2003/0059029 A1 | 3/2003 | Mengshoel et al. | 379/265.02 |
| 2003/0065721 A1 | 4/2003 | Roskind | |
| 2003/0065788 A1 | 4/2003 | Salomaki | 709/227 |
| 2003/0073440 A1 | 4/2003 | Mukherjee et al. | 455/435 |
| 2003/0078979 A1 | 4/2003 | Sagi | |
| 2003/0093482 A1 | 5/2003 | Watanabe et al. | |
| 2003/0101278 A1 | 5/2003 | Garcia-Luna-Aceves et al. | |
| 2003/0105820 A1 | 6/2003 | Haims et al. | 709/205 |
| 2003/0129972 A1 | 7/2003 | Tosaki et al. | 455/414 |
| 2003/0135624 A1 | 7/2003 | McKinnon et al. | 709/228 |
| 2003/0154293 A1 | 8/2003 | Zmolek | 709/228 |
| 2003/0174814 A1 | 9/2003 | Diacakis | 379/80 |
| 2003/0206619 A1 | 11/2003 | Curbow et al. | 379/210.01 |
| 2003/0217099 A1 | 11/2003 | Bobde et al. | |
| 2003/0217142 A1 | 11/2003 | Bobde et al. | |
| 2003/0225848 A1 | 12/2003 | Heikes et al. | |
| 2003/0235287 A1 | 12/2003 | Margolis | 379/265.01 |
| 2004/0037271 A1 | 2/2004 | Liscano et al. | 370/352 |
| 2004/0044647 A1 | 3/2004 | Salmenkaita | 707/1 |
| 2004/0059781 A1 | 3/2004 | Yoakum et al. | |
| 2004/0073614 A1 | 4/2004 | Blohm | |
| 2004/0122810 A1 | 6/2004 | Mayer | |
| 2004/0122901 A1 | 6/2004 | Sylvain | |
| 2004/0125941 A1 | 7/2004 | Yoakum | |
| 2004/0153506 A1 | 8/2004 | Ito et al. | |
| 2004/0172528 A1 | 9/2004 | Tenereillo | |
| 2004/0174966 A1 | 9/2004 | Koch | 379/88.22 |
| 2004/0203746 A1 | 10/2004 | Knauerhase et al. | |
| 2004/0249776 A1 | 12/2004 | Horvitz et al. | 706/21 |
| 2005/0004414 A1 | 1/2005 | Malik et al. | |
| 2005/0074101 A1 | 4/2005 | Moore et al. | 379/114.01 |
| 2005/0117570 A1 | 6/2005 | Cetusic et al. | 370/352 |
| 2005/0172011 A1 | 8/2005 | Gourlay et al. | |

FOREIGN PATENT DOCUMENTS

| | | |
|---|---|---|
| EP | 1 148 688 A1 | 10/2001 |
| EP | 1 225 752 A2 | 7/2002 |
| EP | 1 329 810 A1 | 7/2003 |
| WO | 99/17194 | 4/1999 |

WO WO 99/34628 7/1999

OTHER PUBLICATIONS

PCT International Search Report for PCT/IB03/04250, mailed Jan. 19, 2004.

PCT International Search Report for PCT/IB03/03962, mailed Jan. 28, 2004.

Eschenburg, Axel, "Wo Laufen Sie Denn? ICQ Haelt Verbindung Zu Bekannten," CT Magazin Fuer Computer Technik, Verlag Heinz Heise GMBH, Hannover, Germany, No. 22, Oct. 26, 1998, pp. 92-95, Translation Provided.

Kohda et al., "IMPP: A New Instant Messaging Standard and Its Impact on Internet Business," Fujitsu-Scientific and Technical Journal, Fujitsu Limited, Kawasaki, Japan, vol. 36, No. 2, Dec. 2000, pp. 147-153.

Day, M. et al., "A Model for Presence and Instant Messaging," IETF REquest for Comments, XX, XX, No. 2778, Feb. 2000, pp. 1-17.

Rosenberg, J. et al., "SIP for Presence," IETF Internet Draft, Nov. 13, 1998, XP002173451.

Shim, Hyong Sop et al., "An Example of Using Presence and Availability in an Enterprise for Spontaneous, Multiparty, Multimedia Communications," IPTEL 2001, Apr. 3, 2001, XP002252324.

International Search Report for PCT/IB03/06073, mailed May 4, 2004.

Brodsky, Alexander et al., "Resource Management in Agent-based Distributed Environments," Proceedings of the 1999 International Symposium on Kyoto, Japan Nov. 28-30, 1999, pp. 95-108, XP010379697.

Chapin, Steve J. et al., "Resource Management in Legion," Future Generations Computer Systems, Elsevier Science Publishers, Amsterdam, Netherlands, vol. 15, No. 5-6, Oct. 1999, pp. 583-594, XP004176748.

Krauter, Klaus, et al., "A Taxonomy and Survey of Grid Resource Management Systems for Distributed Computing," Software Practice & Experiance, John Wiley & Sons Ltd., Chichester, Great Britain, vol. 32, No. 2, Feb. 2, 2002, pp. 135-164, XP001091827.

International Search Report for PCT/IB03/05780 mailed Jan. 27, 2005.

Day, M. and Rosenberg, J., "Request for Comments (RFC) 2778: A Model for Presence and Instant Messaging," IETF -Network Working Group, Information Memo, Feb. 2000, XP002201444.

Rosenberg, J. and Schulzrinne, H., "draft-rosenberg-sip-pip.00.txt: SIP for Presence," IETF Internet Draft, Nov. 13, 1998, pp. 1-22, XP002325320.

European Search Report for 03257957.5, mailed Aug. 24, 2005.

\* cited by examiner

PERSONAL USER AGENT

RELATED APPLICATIONS

The present application is related to U.S. application Ser. No. 10/006,942, entitled COMPOSITE USER AGENT, filed Dec. 4, 2001 in the name of Ramsayer et al., the disclosure of which is incorporated herein in its entirety.

FIELD OF THE INVENTION

The present invention relates to controlling packet-switched media sessions, and in particular, relates to a personal user agent for controlling media sessions amongst an associated group of devices.

BACKGROUND OF THE INVENTION

The evolution of packet-switched communications now allows various types of media to be communicated over a common network to devices capable of receiving and processing compatible media. Currently, there exists an eclectic offering of devices capable of supporting data, audio, and video media, alone or in any combination. For example, a personal computer may support all three types of media, whereas a video device may support only video media, a packet-switched telephone may support only audio media, and a personal digital assistant (PDA) may support voice and data. In essence, there are numerous devices having a mixed array of media capabilities.

In an effort to maximize the benefit of having these various media capabilities, users often have a number of devices with various media capabilities. Further, users may have more than one device with a common media capability, but may have a preference of one device over another for a given media capability, depending on quality, venue, or time of communication. Unfortunately, there is no efficient way for a user to manage communications using the various devices in light of their respective media capabilities. To establish a video session between a personal computer and another video device, the user must establish the video session, and if a related audio session should be created between the personal computer and an audio device, the user must control the establishment of a session between the personal computer and the audio device. In order to establish the separate audio and video sessions, the user must establish the respective sessions as if they were unrelated.

As such, there is a need for a way to efficiently manage multiple devices having various media capabilities. There is a further need to automate the establishment of various sessions based on the type of media and the capability of the respective devices. Where multiple devices have a common capability, there is a need for an efficient and automated way to select a preferred one of the devices to establish a media session.

SUMMARY OF THE INVENTION

The present invention relates to a personal user agent acting on behalf of a group of member device agents in a communication network. The personal user agent provides its group of member device agents with a specialized proxy function while representing the group to the network as a single user agent. To devices on the communication network, the personal user agent behaves and is viewed as a user agent. To the group of member device agents, the personal user agent behaves and is viewed as both a registrar and a proxy server.

Although the personal user agent understands the makeup of the group of member device agents, the member device agents need not have knowledge of each other or that they are being represented by the personal user agent to non-member devices. The personal user agent is configured to route incoming messages to one or more of the member device agents based on the capabilities of each of the particular member device agents. A user may configure the personal user agent to establish preferences or priorities for handling media or establishing sessions amongst the member devices.

In one embodiment, all member device agents register with the personal user agent prior to communicating. The personal user agent will then register with a proxy to provide an address or addresses to reach the user. After registration with the proxy, all incoming messages from the network are directed to the personal user agent before being passed to the appropriate member device agent. The member device agents locally configure themselves to send all requests to the personal user agent. As noted, from the viewpoint of the member agent, the personal user agent will appear as a proxy, handling all the responsibilities of a traditional network proxy.

A user may add additional capabilities to a session through the existing member device agent, or by adding an additional member device agent to the session. The other user involved in the session may also add media to the session by sending a message to the personal user agent requesting additional media to be added to the session. The personal user agent will determine if an additional member device agent needs to be brought into the session based upon which member device agent is preferred for the requested media type and establish the session with the additional member device or the existing device.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The present invention provides for an agent that acts on behalf of a group of associated devices on a communication network. The agent provides its group of devices with a specialized proxy function, while representing the group to the network as a single entity. The agent routes incoming messages to the various devices based on the device's media capability. One or more communication sessions may be established via the agent between one or more devices based on the type of media session. The concepts of the present invention are applicable to various communication environments and related protocols.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
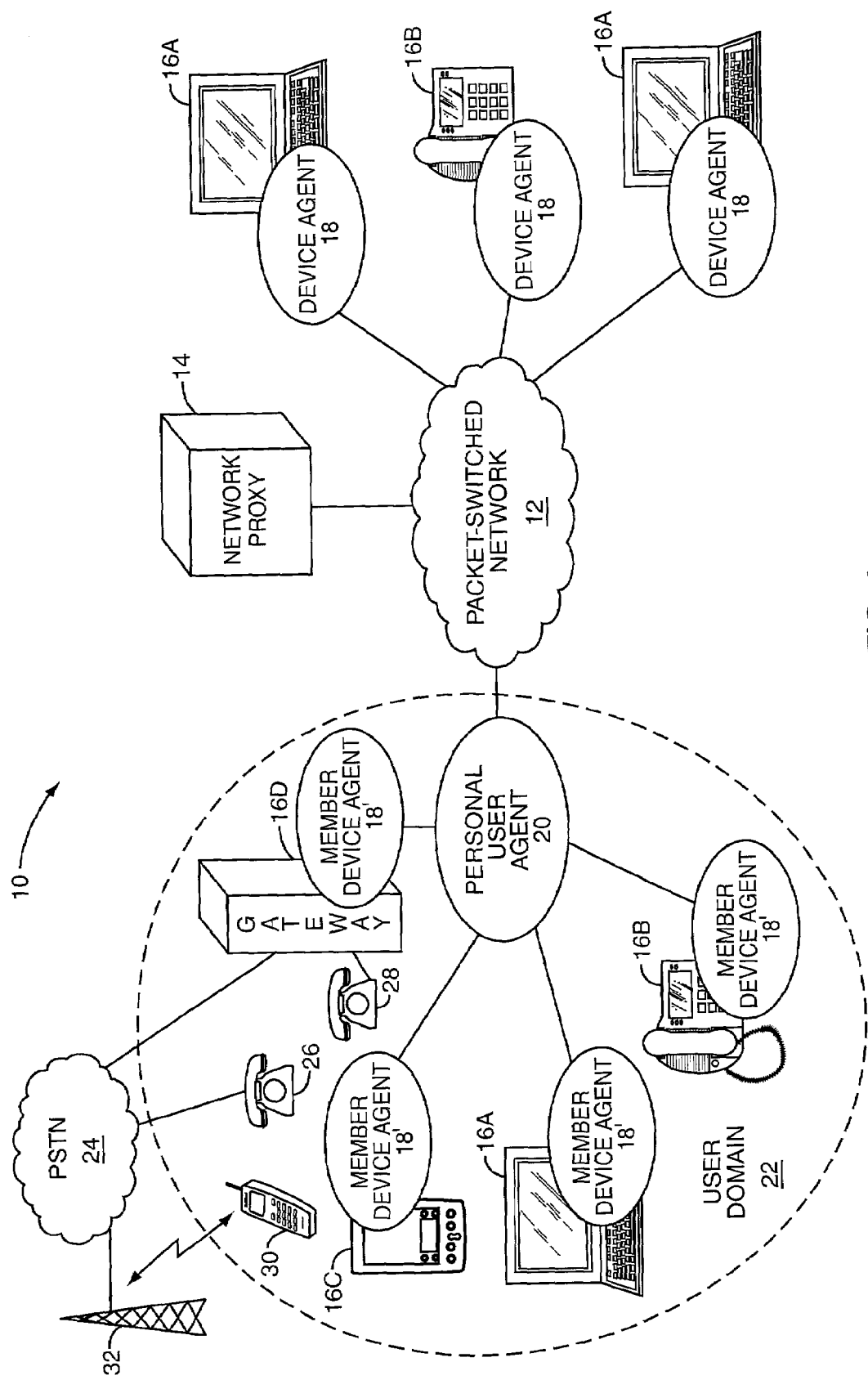
FIG. 1 is a block representation of a communication environment configured according to one embodiment of the present invention.

In the communication environment 10 illustrated in FIG. 1, a packet-switched network 12 is provided in association with a proxy 14, which facilitates media sessions between any number of endpoints 16A-16D. These endpoints 16 may support any one or a combination of data, audio, and voice media sessions, depending on the configuration of the device. Although not inclusive, typical endpoints 16 may take the form of a personal computer (PC) 16A, a direct or wireless packet-switched compatible telephone 16B, a PDA 16C, or a gateway 16D capable of supporting any number of telephony devices or providing an interface to other networks, as will be described in more detail below. For clarity, a generic endpoint will be referenced as 16.

An endpoint 16 is capable of running an application, which is generally referred to as a device agent 18, capable of facilitating media sessions using a corresponding protocol. The term device agent, or member device agent as used below, may represent any type of protocol agent, interface, or communication function, supporting media capabilities for a device either directly or indirectly via a gateway, proxy, or the like. Device agents 18 typically register their ability to establish sessions with the proxy 14 to inform the proxy 14 of the universal resource locator (URL) tat identifies the device agent 18 to the network 12. The device agent 18 way also provide information about how it can be reached over the network 12. The information typically includes the Internet Protocol (IP) address and port that the device agent 18 will use for media sessions.

Typically, when a device agent 18 wants to establish a session with another device agent 18, the device agent 18 initiating the session will send a request to the proxy 14 and specify the targeted device agent 18. Identification of the device agent 18 may take the form of a URL. The proxy 14 will use the URL provided in the message to determine if the targeted device agent 18 is registered with the proxy 14. Generally, the user name is unique within the name space of the specified domain.

If the targeted device agent 18 has registered with the proxy 14, the proxy 14 will send a message directly to the targeted device agent 18 to establish a session between the respective device agents 18. Media capabilities are passed between the two device agents 18 of the respective endpoints 16. Once respective endpoints 16 are in an active session with each other and have determined each others capabilities, the specified media content may be exchanged during an appropriate media session.

The present invention provides for a personal user agent 20, which is an application program that acts on behalf of a group of device agents 18, designated as member device agents 18'. The personal user agent 20 provides its group of member device agents 18' with a specialized proxy function while representing the group to other device agents 18 over the network 12 as a single device agent 18. Each member device agent 18' is a device agent 18 that has registered with and is being represented by the personal user agent 20.

Preferably, to device agents 18 over the network 12, the personal user agent 20 behaves and is viewed as a single device agent 18 having the media capabilities of all of the member device agents 18'. Other device agents 18 interacting with the personal user agent 20 need not have knowledge of the individual member device agents 18' represented by the personal user agent 20. The personal user agent 20 and the associated endpoints 16 implementing the member device agents 18' form a user domain 22.

To the member device agents 18', the personal user agent 20 behaves and is viewed as both a registrar and a proxy server. The personal user agent 20 is aware of the member device agents 18' within the user domain 22; however, the member device agents 18' need not be aware of each other, even when two or more of the member device agents 18' are involved in associated multimedia sessions. Preferably, the personal user agent 20 is configured to route incoming messages configured to establish a media session or sessions to one or more of the member device agents 18' based on the capabilities of the respective member device agents 18'. Preferably, the personal user agent 20 is viewed by devices with which it interfaces as either a device agent 18 or a network proxy 14, as defined in their supporting protocols.

In one embodiment, the personal user agent 20 includes three components: a session manager, a call manager, and a data manager. A session is generally defined as an exchange of messages between the personal user agent 20 and another entity. The session manager will handle the reception of incoming messages and transmission of outgoing messages for each protocol supported by the personal user agent 20. The session manager will notify the call manager when messages have been received or transmitted, and maintain a list of active sessions, which are each preferably identified by session identification (ID). The session manager may also be responsible for storing and providing access to all messages received or transmitted for each session.

A call is generally defined as a set of all sessions and media streams used between two end users. A call manager may be responsible for maintaining a list of active calls and the sessions and media streams associated with each call, as well as deciding what course of action to take when an event occurs. The events may include, for example, an incoming message being reported by the session manager. The call manager may also provide an interface with addressing applications, such as Microsoft Outlook's contact list, when a destination address is needed.

The data manager may provide an interface to the user to allow for the provisioning of device addresses, the user's public address, call configurations, and any other provision data. The data manager may handle dynamic and static presence information for each device in the user domain 22 and store the call configurations, such as profiles, to be used when originating calls based on the device used to originate the call. The data manager may also store call configurations to be used when terminating calls based on the termination address used. The call configurations may define associated devices necessary to facilitate related media sessions.

Continuing with FIG. 1, various types of media sessions may be established through numerous devices. As noted, these sessions may be facilitated through direct or wireless packet-switched networks using IP, Wireless Application Protocol (WAP), and the like. Communications extending to other networks may be facilitated through a gateway 16D, which also runs an application implementing a member device agent 18'. The gateway 16D may be configured to facilitate communications between the network 12 and a disparate network, such as the public switched telephone network (PSTN) 24. As such, audio and data communications may be facilitated through devices supported by the PSTN 24, such as telephony device 26. Alternatively, the gateway 16D may directly support one or more telephony devices 28.

Typically, these telephony devices 26, 28 incorporate circuit-switched communications, wherein the gateway 16D must be configured to translate between packet- and circuit-switched communications. Notably, the PSTN 24 may support, include, or otherwise be associated with wireless communication networks facilitating circuit-switched communications. These wireless circuit-switched networks facilitate communications with mobile terminals 30, such as wireless telephones and PDAs, through base stations 32 in traditional fashion.

In one embodiment, the personal user agent 20 is provisioned with the following information. First, the address of each endpoint 16 and the media or medias it supports. This may be accomplished by having each endpoint 16 dynamically register with the personal user agent 20, as well as providing static provisioning. Second, the personal user agent 20 should be provided the public addresses that others will use to contact the user associated with the user domain 22. The personal user agent 20 will register these addresses with the network proxy 14. The present invention allows the user to have one or more addresses; however, the user may choose to use only a single address, even though multiple endpoints 16 and medias may be used. Third, the personal user agent 20 should have a list of medias and endpoints 16 that a user wishes to use when originating a call from any one of the various endpoints 16. Fourth, the personal user agent 20 should have a list of medias that are permitted when terminating a call based upon the termination address being used. Fifth, the personal user agent 20 should have a list of devices to be used for each media when terminating a call based upon the termination address used. Preferences may also be indicated for each device in the list based upon where the user may be when a call is received. The call manager function may use this information, plus the availability of each device, if known, at the time of the call to determine which device to use.

As noted, all member device agents 18' within the user domain 22 that wish to be represented by the personal user agent 20 must register with the personal user agent 20. As such, each member device agent 18' may send a registration message to the personal user agent 20, or the personal user agent 20 may be configured with registration data corresponding to each member device agent 18'. Independent of the registration of the member device agents 18', the personal user agent 20 should register with the proxy server 14 to provide the various addresses corresponding to the member device agents 18' within the user domain 22. Once registration is complete, all incoming session requests from the network 12 are directed to the personal user agent 20 before being passed to the appropriate member device agents 18'. Also note that a member device agent 18' that has registered with the personal user agent 20 may also register with the proxy 14 using another address. This allows the personal user agent 20 to be bypassed when desired.

All member device agents 18' are configured to send session requests to the personal user agent 20. From the viewpoint of the member device agents 18', the personal user agent 20 acts as a proxy handling all the traditional responsibilities of a traditional network proxy 14. In most cases, the personal user agent 20 will pass all incoming requests from its member device agents 18' to the network proxy 14; however, it may be desirable for the personal user agent 20 to send session requests directly to a remote user agent 18 using a corresponding URL, if such capability is desired.

The personal user agent 20 is differentiated from traditional proxies in that it can be configured to route session requests to one or more of its member device agents 18' based upon capabilities of the respective member device agents 18'. Traditionally, a proxy has the ability to fork session requests when more than one device agent 18 is registered using the same address, but the choice is to either send the request to all, such as a multicast session, or to just one, such as a unicast session, wherein the decision is made independently of the capabilities of each device agent 18. The personal user agent 20 is different, in that it examines content information of incoming messages and routes the message to the preferred member device agent 18' that handles the media type specified in the message. If more than one media type is requested the personal user agent 20 may route the message to each member device agent 18' that is preferred for each media type.

When the user domain 22 includes member device agents 18' supporting common media types, various types of profiles and preferences may be defined in the personal user agent 20. The profiles and preferences may dictate selection of a member device agent 18' based on priority, timing, availability, and the like. For example, a first of two member device agents 18' supporting a common media type may be selected during normal work hours, while the other may be selected during non-work hours. The profiles or preferences may also make these selections based on the need for additional media capabilities or the source of incoming media. Those skilled in the art will recognize numerous variations and combinations for such profiles and preferences.

The manner in which the personal user agent 20 determines which member device agent 18' is preferred for each media type is a matter of implementation. The preferences or profiles can be provisioned on each personal user agent 20, or the personal user agent 20 could query the capabilities of each member device agent 18'. If the personal user agent 20 receives a message with a media type that is not supported by any of its member device agents 18', the personal user agent 20 could respond with a message indicating that the media type is not supported.

Figure 2:
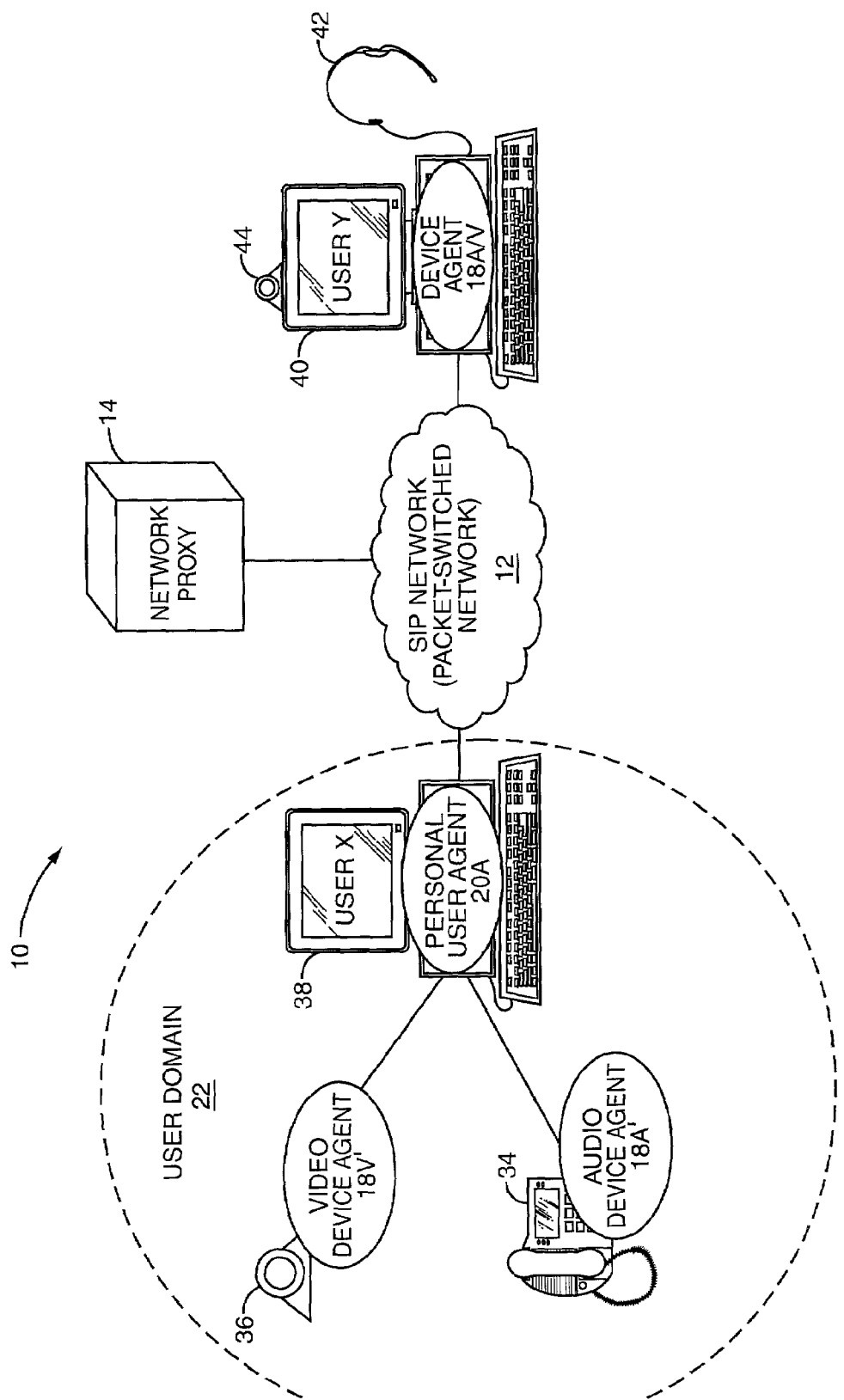
FIG. 2 is a simplified communication environment for an exemplary embodiment of the present invention.

A couple of exemplary scenarios follow in view of the communication environment 10 illustrated in FIG. 2. For the purposes of illustration, pseudo messages are used in a generic fashion to highlight the concepts of the invention. Those skilled in the art will recognize the various protocols and messaging schemas that can take advantage the concepts described herein. As illustrated, a composite system 38, which represents any type of computing device, is used to implement the personal user agent 20A. The composite system 38 forms the user domain 22 with two endpoints 16: an audio device 34 implementing a member device agent 18A', and a video device 36 implementing a member device agent 18V'. As described above, the device agents 18A' and 18V' for the respective audio device 34 and video device 36 have registered with the personal user agent 20A of composite system 38. The user associated with the user domain 22 and the personal user agent 20A is User X.

Given the configuration of FIG. 2, the user domain 22 for User X has audio capability through audio device 34 and video capability through video device 36. In the illustrated embodiment, the video device 36 is a video camera running on composite system 38, which is a personal computer. The personal user agent 20A recognizes the respective devices and their capabilities, and has registered with the proxy 14 as a single device agent on behalf of both the audio device 34 and video device 36.

Assume that User X of the user domain 22 desires to participate in a media session requiring audio and video capabilities with User Y, who has an audio/video device 40, such as a multimedia personal computer having an audio device 42 and video device 44. From the perspective of the proxy 14 and the device agent 18A/V running on the audio/video (A/V) device 40, the media session with User X must be established with the personal user agent 20A of the composite system 38 as if it were a traditional endpoint 16 and device agent 18.

Figure 3:
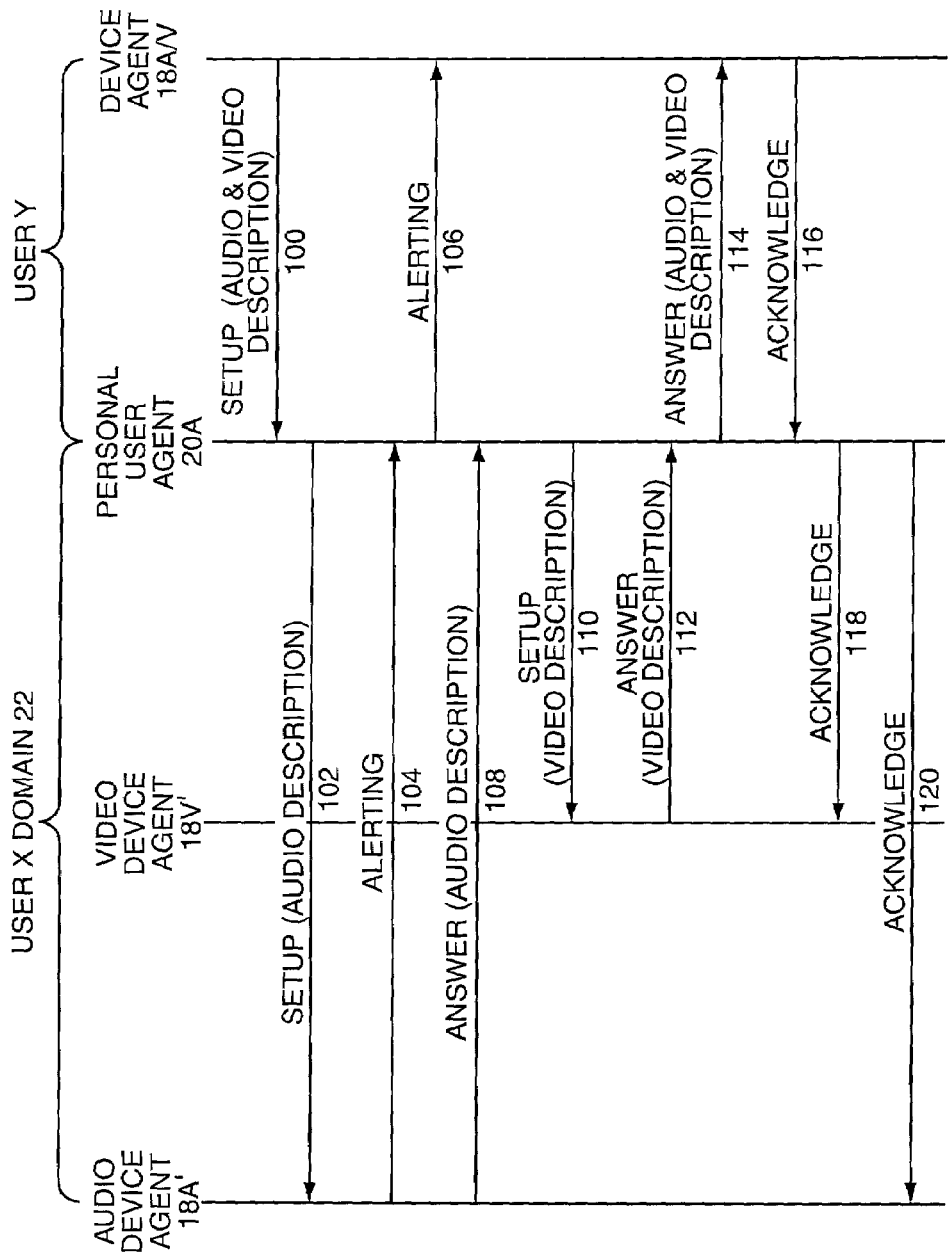
FIG. 3 is an exemplary communication flow diagram wherein User Y uses a single desktop application to make an audio and video call to User X, who uses a video application for video and a telephone for audio according to a preferred embodiment of the present invention.

An exemplary communication flow diagram is illustrated in FIG. 3 wherein User Y uses a single desktop application to make an audio and video call to User X, who uses a video application for video and a telephone 34 for audio. Initially, the device agent 18A/V resident on A/V device 40 of User Y originates a multimedia session from an audio and video application to User X using User X's public IP address by sending a SETUP message containing an audio and video session description (step 100). The network proxy 14 will route the message to the personal user agent 20A residing on the composite system 38 of User X.

Upon receipt of the message, the personal user agent 20A will check a profile identifying terminations that use User X's public IP address. Assuming both audio and video terminations are possible, the personal user agent 20A determines which of the endpoints should be used to establish sessions based on the available endpoints, their capabilities, the state of the endpoints, the location of User X, or a combination thereof. Those skilled in the art will recognize other selection criteria. For this example, assume that User X is in his office and has chosen to use the audio device 34, such as a telephone, for audio sessions and the video device 36, such as an application on a computer and associated camera, for video sessions. The audio and video devices 34 and 36 include the audio and video device agents 18A' and 18V', respectively.

Once the audio and video devices 34 and 36 are selected, the personal user agent 20A creates an audio session with the audio device 34 via the audio device agent 18A'. The audio session is initiated by sending a SETUP message including a description of the audio session to the audio device agent 18A' (step 102). In response, the audio device agent 18A' will send an ALERTING message to the personal user agent 20 indicating that the audio device agent 18A' is attempting to the establish the session (step 104). During this time, the audio device 34 may ring to alert User X of the incoming session or call. The personal user agent 20A will forward the ALERTING message to the device agent 18A/V for User Y on behalf of the audio device agent 18A' (step 106). Once the audio device agent 18A' establishes the termination for the audio session, it will send an ANSWER message including a description for the audio session to the personal user agent 20A (step 108).

Next, the video session is initiated by sending a SETUP message including a description of the video session to the video device agent 18V' (step 110). Once the video device agent 18V' establishes the termination for the video session, it will send an ANSWER message including a description for the audio session to the personal user agent 20A (step 112). Upon determining that the terminations for the audio and video sessions are established, the personal user agent 20 will forward and ANSWER message including the audio and video descriptions to the device agent 18A/V of User Y (step 114).

In response to the ANSWER message from the personal user agent 20A, the device agent 18A/V of User Y will initiate an ACKNOWLEDGE message for the audio and video sessions to the personal user agent 20A (step 116). The personal user agent 20A will then send an ACKNOWLEDGE message for the video session to the video user agent 18V' (step 118) and send an ACKNOWLEDGE message for the audio session to the audio user agent 18A' (step 120). At this point, an audio session is established between the audio device agent 18A' of User X and the device agent 18A/V of User Y, and a video session is established between the video device agent 18V' of User X and the device agent 18A/V of User Y.

Figure 4:
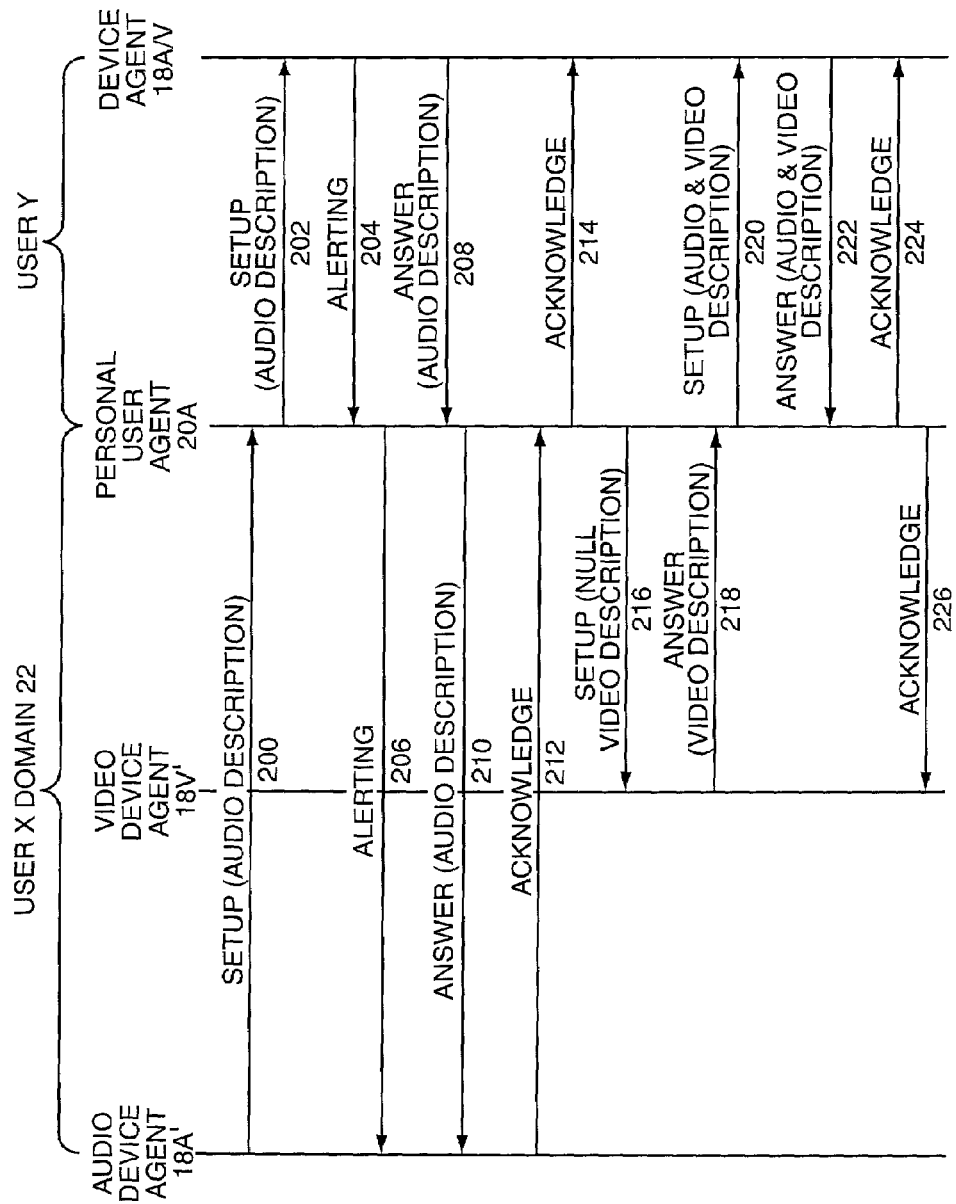
FIG. 4 is an exemplary communication flow diagram wherein User X originates a call from a telephone and a video application is automatically brought into the communication session according to a preferred embodiment of the present invention.

With reference to FIG. 4, an exemplary communication flow diagram is illustrated wherein User X originates a call from a telephone 34 and subsequently a video application is automatically brought into the communication session. Initially, User X initiates a call from the audio device 34 to User Y's A/V device 40. Accordingly, the audio device agent 18A' resident on audio device 34 originates a multimedia session to User Y using User Y's public IP address by sending a SETUP message containing an audio session description to the personal user agent 20A (step 200). The personal user agent 20A may then check profiles associated with originations made from the audio device 34.

Assume that video is to be included in the session along with the audio. Next, the personal user agent 20A determines which of User X's endpoints should be used to handle the video session. For the present example, assume that video device 36 and the composite device 38 combine to provide a bi-directional video session. Again, the personal user agent 20A determines which of the endpoints should be used to establish the video session based on the available endpoints, their capabilities, the state of the endpoints, the location of User X, or a combination thereof.

Once the device to handle the video session is determined, the personal user agent 20A will set a flag to automatically establish the video session in association with the call once User Y answers. Alternatively, the personal user agent 20A could decide to establish the video session prior to establishing the call. Assuming the call should be answered prior to continuing, the personal user agent 20A will then send a SETUP message with an audio session description to the device agent 18A/V (step 202), which will respond by initiating ringing, or like alert for User Y, and sending an ALERTING message back to the personal user agent 20A (step 204). The personal user agent 20A will forward the ALERTING message to the audio device agent 18A' (step 206). When User Y answers the call, the device agent 18A/V will send an ANSWER message including the audio session description to the personal user agent 20A (step 208), which will forward the ANSWER message to the audio device agent 18A' (step 210). The audio device agent 18A' will respond by sending an ACKNOWLEDGE message to the personal user agent 20A (step 212), which will forward the ACKNOWLEDGE message to the device agent 18A/V (step 214).

At this point, the audio session between User X and User Y is established and the personal user agent 20A will initiate the video session. To initiate the video session, the personal user agent 20A may send a SETUP message with a null video description to the video device agent 18V' (step 216), which will trigger the video device agent 18V' to send an ANSWER message containing the appropriate video session description to the personal user agent 20A (step 218). In response, the personal user agent 20A will send a SETUP message, including the audio and video session descriptions for the established audio session and the requested video session, to the device agent 18A/V of User Y (step 220). The device agent 18A/V will send an ANSWER message including its audio and video session descriptions to the personal user agent 20A (step 222), which will send ACKNOWLEDGE messages to the device agent 18A/V of User Y (step 224) and the video device agent 18V' of User X (step 226). At this point both the audio and video session are established between the respective devices of User X and User Y.

Figure 5:
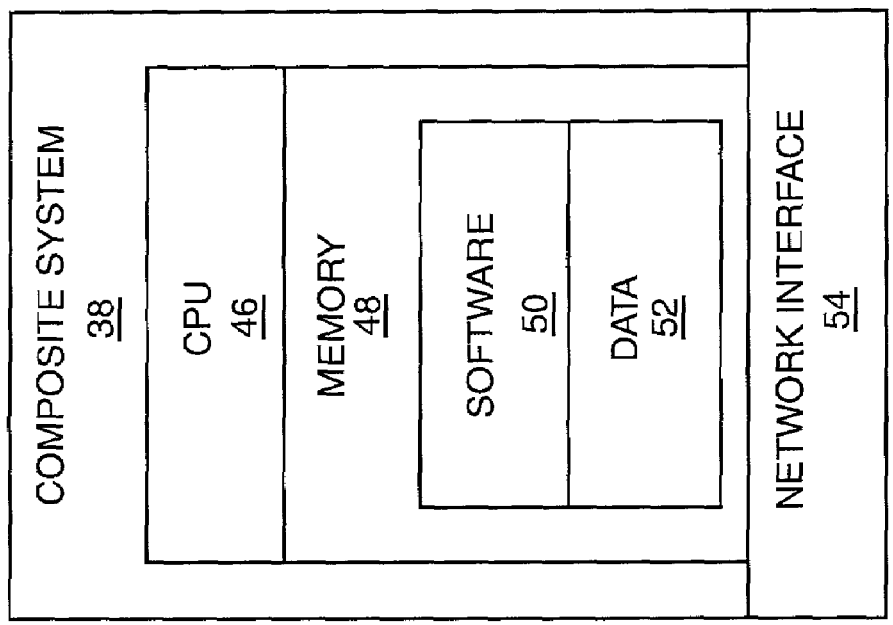
FIG. 5 is a block representation of a composite system capable of implementing a personal user agent according to one embodiment of the present invention.

As illustrated in FIG. 5, a typical composite system 38 may include a control system implemented with a central processing unit (CPU) 46 associated with memory 48. The memory 48 would contain the necessary software 50 and data 52 for implementing the personal user agent 20. A network interface 54 is also associated with the CPU 46 to facilitate packet-switched communications over the network 12.

The present invention provides for integrating and aggregating end user communication devices on a per user basis in order to provide numerous benefits and capabilities. A user may be contacted using a single address, regardless off which means of communication is being used and regardless of the user's location. For example, user X@nortelnetworks.com is an address used to place a voice call to User X whether he is in the office, can be reached on his mobile terminal, or is at home. The technique can also be used when sending an instant message to User X at any location. Further, users may engage in a multimedia communication session using disparate collections of single and multiple media communication devices. As outlined above, User Y uses a single desktop application to make a voice and video call to User X, who uses a video application for video and an office telephone for audio. The user may also configure unique sets of media and the respective devices to be used when starting a communication session, based on which communication device is used to originate the session. For example, if User X originates a call from his office phone, his video application on his personal computer is automatically brought into the communication session. If he originates a call from his mobile phone, no additional devices are brought into the session.

A user may configure unique sets of media to be permitted when accepting a communication session based on the address used to establish the session. For example, video and audio is permitted when User X's business address is used, but only audio is permitted when his home address is used. For each media type permitted when accepting a communication session based on the address, a user may configure a list of devices to be considered for use. From this list, dynamic presence information can be used to determine which device to use. For example, assume that User X has configured a list of all his audio devices to be used when audio calls are made to his business address. The call will be sent to his desk telephone unless he is away from his desk and his mobile phone is active, in which case the calls will be sent to his mobile telephone. Various techniques for presence detection may be used, such as monitoring keyboard activity or the activation of a screen saver.

A user may add additional media to communication sessions without having to make an additional call or specify an address. For example, application sharing can be added to an audio call using the existing signaling session already established. Thus, a separate call is not needed. Furthermore, the address that is used when placing the audio call is reused again when adding the application sharing session.

The user may initiate a call from a device or application for the sole purpose of providing an address for the call, while other devices are actually used in the communication session. For example, selecting User Y from Microsoft Outlook's contact list may cause User X's office telephone to ring, and upon answer, establish a multimedia call with User Y. This capability supplies an address book capability to devices that do not have one. It can also be used with devices that have their own address capability, but wherein the user wishes only to use and maintain a single address book across all devices.

The user may also configure a controlling media type that when placed on hold, released, etc., will cause all other media in the communications to be treated in the same manner. Assume that User X and User Y are involved in an audio and video communication session, and User X has configured audio to be his controlling media type. Upon User X hanging up his phone, his associated video device is also released, and the session with User Y will end. If User X has closed his video application first, he would still keep the audio connection with User Y, if so desired.

Those skilled in the art will recognize improvements and modifications to the preferred embodiments of the present invention. All such improvements and modifications are considered within the scope of the concepts disclosed herein and the claims that follow.

What is claimed is:

1. A system for providing a personal user agent for a plurality of devices in a user domain, the system comprising:
   a) an interface facilitating communications; and
   b) a control system associated with the interface and adapted to:
      i) register the plurality of devices that are in the user domain and associated with a user, each of the plurality of devices having a media capability; and
      ii) for an incoming call intended for the user:
         A) receive a session message on behalf of the user initiating the incoming call and identifying a first requested media capability to facilitate a media session for the incoming call;
         B) select a first of the plurality of devices based on the first requested media capability; and
         C) communicate with the first of the plurality of devices to establish the media session having the first requested media capability for the incoming call; and
      iii) represent each of the plurality of devices in the user domain as a single device having a plurality of media capabilities to devices outside of the user domain.

2. The system of claim 1 wherein the control system is further adapted to:
   a) determine that a second media session having a second requested media capability has been requested for the incoming call;
   b) select a second of the plurality of devices based on the second requested media capability; and c) communicate with the second of the plurality of devices to establish the second media session having the second requested media capability for the incoming call.

3. The system of claim 2 wherein the session message initiating the incoming call identifies the second media session and the second requested media capability and the control system is further adapted to determine that the second media session having the second requested media capability has been requested for the incoming call based on the session message.

4. The system of claim 2 wherein the session message initiating the incoming call identifies the second media session and the second requested media capability and the control system is further adapted to receive a session message initiating the second media session from the second of the plurality of media devices to determine that the second media session having the second requested media capability has been requested for the incoming call.

5. The system of claim 2 wherein the control system is further adapted to receive a second session message associated with the incoming call and identifying the second media session to determine that the second media session having the second requested media capability has been requested for the incoming call.

6. The system of claim 1 wherein, for an outgoing call initiated by the user, the control system is further adapted to:
 a) receive a session message initiating the outgoing call from one of the plurality of devices; and
 b) send a message corresponding to the session message to establish the media session for the outgoing call on behalf the user.

7. The system of claim 6 wherein the control system is further adapted to:
 a) determine that a second media session having a second requested media capability has been requested for the outgoing call; and
 b) communicate with a second of the plurality of devices to establish the second media session having the second requested media capability for the outgoing call.

8. The system of claim 7 wherein the control system is further adapted to select the second of the plurality of devices based on the second requested media capability.

9. The system of claim 1 wherein the control system is further adapted to provide a single address for each of the plurality of devices in the user domain.

10. The system of claim 1 wherein the control system is further adapted to:
 a) provide a profile defining at least one combination of the plurality of devices to select for a call based on combinations of media capabilities requested for the call; and
 b) select the at least one combination of the plurality of devices for the call.

11. The system of claim 1 wherein the control system is further adapted to:
 a) provide a profile defining at least one other of the plurality of devices to select when a call is initiated from one of the plurality of devices; and
 b) select the at least one other of the plurality of devices requested for the call.

12. The system of claim 1 wherein the control system is further adapted to:
 a) determine that a second media session having a second requested media capability has been requested for the incoming call;
 b) select the first of the plurality of devices based on the second requested media capability; and
 c) communicate with the first of the plurality of devices to establish the second media session having the second requested media capability for the incoming call.

13. A computer readable medium having software for providing a personal user agent for a plurality of devices in a user domain, the software comprising instructions for a computer to:
 a) register the plurality of devices that are in the user domain and associated with a user, each of the plurality of devices having a media capability; and
 b) for an incoming call intended for the user:
  i) receive a session message on behalf of the user initiating the incoming call and identifying a first requested media capability to facilitate a media session for the incoming call;
  ii) select a first of the plurality of devices based on the first requested media capability; and
  iii) communicate with the first of the plurality of devices to establish the media session having the first requested media capability for the incoming call; and
 c) represent each of the plurality of devices in the user domain as a single device having a plurality of media capabilities to devices outside of the user domain.

14. The computer readable medium of claim 13 further comprising instructions to:
 a) determine that a second media session having a second requested media capability has been requested for the incoming call;
 b) select a second of the plurality of devices based on the second requested media capability; and
 c) communicate with the second of the plurality of devices to establish the second media session having the second requested media capability for the incoming call.

15. The computer readable medium of claim 14 wherein the session message initiating the incoming call identifies the second media session and the second requested media capability and further comprising instructions adapted to determine that the second media session having the second requested media capability has been requested for the incoming call based on the session message.

16. The computer readable medium of claim 14 wherein the session message initiating the incoming call identifies the second media session and the second requested media capability and further comprising instructions to receive a session message initiating the second media session from the second of the plurality of media devices to determine that the second media session having the second requested media capability has been requested for the incoming call.

17. The computer readable medium of claim 14 further comprising instructions to receive a second session message associated with the incoming call and identifying the second media session to determine that the second media session having the second requested media capability has been requested for the incoming call.

18. The computer readable medium of claim 13 wherein, for an outgoing call initiated by the user, further comprising instructions to:
 a) receive a session message initiating the outgoing call from one of the plurality of devices; and
 b) send a message corresponding to the session message to establish the media session for the outgoing call on behalf the user.

19. The computer readable medium of claim 18 further comprising instructions to:

a) determine that a second media session having a second requested media capability has been requested for the outgoing call; and
b) communicate with a second of the plurality of devices to establish the second media session having the second requested media capability for the outgoing call.

20. The computer readable medium of claim 19 further comprising instructions to select the second of the plurality of devices based on the second requested media capability.

21. The computer readable medium of claim 13 further comprising instructions to provide a single address for each of the plurality of devices in the user domain.

22. The computer readable medium of claim 13 further comprising instructions to:
a) provide a profile defining at least one combination of the plurality of devices to select for a call based on combinations of media capabilities requested for the call; and
b) select the at least one combination of the plurality of devices for the call.

23. The computer readable medium of claim 13 further comprising instructions to:
a) provide a profile defining at least one other of the plurality of devices to select when a call is initiated from one of the plurality of devices; and
b) select the at least one other of the plurality of devices requested for the call.

24. The computer readable medium of claim 13 further comprising instructions to:
a) determine that a second media session having a second requested media capability has been requested for the incoming call;
b) select the first of the plurality of devices based on the second requested media capability; and
c) communicate with the first of the plurality of devices to establish the second media session having the second requested media capability for the incoming call.

25. A method for providing a personal user agent for a plurality of devices in a user domain comprising:
a) registering the plurality of devices that are in the user domain and associated with a user, each of the plurality of devices having a media capability; and
b) for an incoming call intended for the user:
  i) receiving a session message on behalf of the user initiating the incoming call and identifying a first requested media capability to facilitate a media session for the incoming call;
  ii) selecting a first of the plurality of devices based on the first requested media capability; and
  iii) communicating with the first of the plurality of devices to establish the media session having the first requested media capability for the incoming call; and
c) representing each of the plurality of devices in the user domain as a single device having a plurality of media capabilities to devices outside of the user domain.

26. The method of claim 25 further comprising:
a) determining that a second media session having a second requested media capability has been requested for the incoming call;
b) selecting a second of the plurality of devices based on the second requested media capability; and
c) communicating with the second of the plurality of devices to establish the second media session having the second requested media capability for the incoming call.

27. The method of claim 26 wherein the session message initiating the incoming call identifies the second media session and the second requested media capability and further comprising determining that the second media session having the second requested media capability has been requested for the incoming call based on the session message.

28. The method of claim 26 wherein the session message initiating the incoming call identifies the second media session and the second requested media capability and further comprising receiving a session message initiating the second media session from the second of the plurality of media devices to determine that the second media session having the second requested media capability has been requested for the incoming call.

29. The method of claim 26 further comprising receiving a second session message associated with the incoming call and identifying the second media session to determine that the second media session having the second requested media capability has been requested for the incoming call.

30. The method of claim 25 further comprising, for an outgoing call initiated by the user:
a) receiving a session message initiating the outgoing call from one of the plurality of devices; and
b) sending a message corresponding to the session message to establish the media session for the outgoing call on behalf the user.

31. The method of claim 30 further comprising:
a) determining that a second media session having a second requested media capability has been requested for the outgoing call; and
b) communicating with a second of the plurality of devices to establish the second media session having the second requested media capability for the outgoing call.

32. The method of claim 31 further comprising selecting the second of the plurality of devices based on the second requested media capability.

33. The method of claim 25 further comprising providing a single address for each of the plurality of devices in the user domain.

34. The method of claim 25 further comprising:
a) providing a profile defining at least one combination of the plurality of devices to select for a call based on combinations of media capabilities requested for the call; and
b) selecting the at least one combination of the plurality of devices for the call.

35. The method of claim 25 further comprising:
a) providing a profile defining at least one other of the plurality of devices to select when a call is initiated from one of the plurality of devices; and
b) selecting the at least one other of the plurality of devices requested for the call.

36. The method of claim 25 further comprising:
a) determining that a second media session having a second requested media capability has been requested for the incoming call;
b) selecting the first of the plurality of devices based on the second requested media capability; and
c) communicating with the first of the plurality of devices to establish the second media session having the second requested media capability for the incoming call.

\* \* \* \* \*